(12) United States Patent
Miller et al.

(10) Patent No.: US 11,297,134 B2
(45) Date of Patent: Apr. 5, 2022

(54) LIVE PROXIMITY-BASED MEDIA TRANSFER

(71) Applicant: Cyan, Inc., Mead, WA (US)

(72) Inventors: Rand Miller, Spokane, WA (US); Robin Barr Miller, Spokane, WA (US); Tony Fryman, Colbert, WA (US)

(73) Assignee: Cyan, Inc., Mead, WA (US)

( * ) Notice: Subject to any disclaimer, the term of this patent is extended or adjusted under 35 U.S.C. 154(b) by 314 days.

(21) Appl. No.: 16/439,519

(22) Filed: Jun. 12, 2019

(65) Prior Publication Data
US 2020/0396278 A1 Dec. 17, 2020

(51) Int. Cl.
*H04L 67/104* (2022.01)
*H04L 67/06* (2022.01)

(52) U.S. Cl.
CPC ............ *H04L 67/104* (2013.01); *H04L 67/06* (2013.01)

(58) Field of Classification Search
None
See application file for complete search history.

(56) References Cited

U.S. PATENT DOCUMENTS

| | | | | |
|---|---|---|---|---|
| 8,060,018 B2* | 11/2011 | Davis | .................... | H04W 84/18 455/41.3 |
| 2007/0299778 A1 | 12/2007 | Haveson et al. | | |
| 2008/0209577 A1* | 8/2008 | Vrielink | ............... | H04L 67/1068 726/29 |
| 2010/0274916 A1 | 10/2010 | Lin | | |
| 2012/0184248 A1 | 7/2012 | Speede | | |
| 2013/0275312 A1 | 10/2013 | Claman et al. | | |
| 2014/0053078 A1* | 2/2014 | Kannan | ................. | H04W 4/023 715/748 |
| 2015/0281107 A1* | 10/2015 | Dorcey | ............... | H04L 65/4046 370/235 |
| 2016/0234151 A1 | 8/2016 | Son | | |
| 2019/0082293 A1* | 3/2019 | Rifkin | ................... | G06F 16/587 |

OTHER PUBLICATIONS

PCT Search Report and Written Opinion dated Sep. 1, 2020 for PCT Application No. PCT/US20/34869, 10 pages.

* cited by examiner

*Primary Examiner* — Mohamed Ibrahim
(74) *Attorney, Agent, or Firm* — Lee & Hayes, P.C.

(57) ABSTRACT

Systems and methods for live proximity-based media transfer are disclosed. For example, a secure network between a sharer device and a viewer device may be established when the devices are within a given geographic area of one another. An instance of an application running on each device may be utilized to authenticate a sharing session and then the sharer device may share media with the viewer device. The viewer device may have its functionality limited when in the viewer mode such that the viewer device may only view the shared media, zoom the view of the media, and/or exit the sharing session and/or application. The shared media is not saved to the viewer device and cannot be permanently manipulated by the viewer device.

20 Claims, 8 Drawing Sheets

LIVE PROXIMITY-BASED MEDIA TRANSFER

BACKGROUND

Use of electronic devices to perform actions and/or to retrieve information has become ubiquitous. Additionally, the sharing of media such as photographs has been a common command by users of electronic devices. Described herein are improvements in technology and solutions to technical problems that can be used to, among other things, control the transfer of media data.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DETAILED DESCRIPTION

Figure 1:
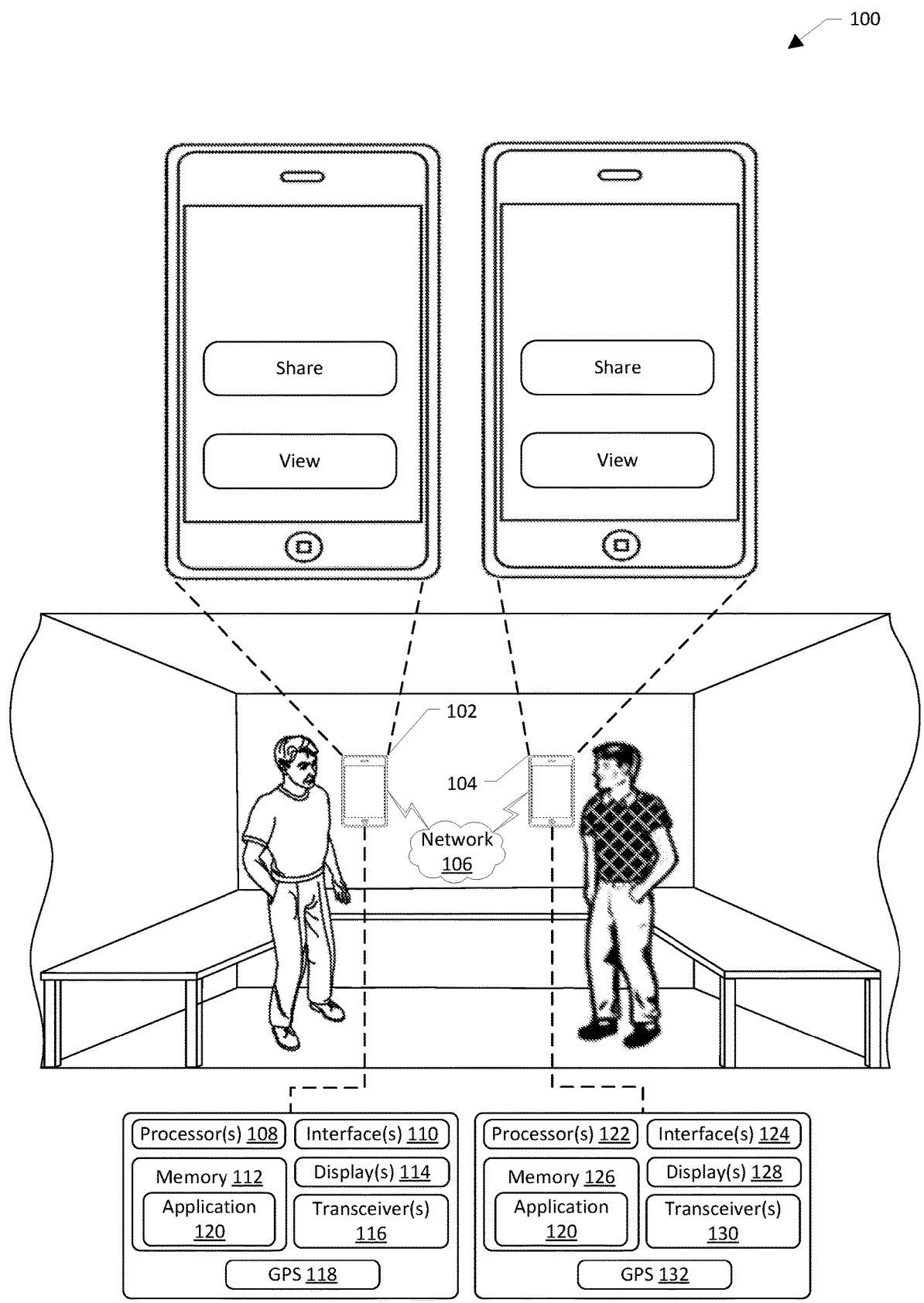
FIG. 1 illustrates a schematic diagram of an example environment for live proximity-based media transfer.

Systems and methods for live proximity-based media transfer are disclosed. Take, for example, a situation where a first user of a first electronic device, such as a mobile phone, desires to share photos or other media with a second user of a second electronic device. To perform such sharing, the first user may access a database on the first device and then physically hand the first device to the second user so that the second user may scroll through the database. Alternatively, the first user may maintain physical control of the first device but may instead have the second user come into close proximity, perhaps uncomfortably close proximity, to the first user to view the photos on the first device. Or, the first user may send the photos to the second device, such as via SMS message, email, etc. such that the second device permanently has the photos, unless expressly deleted by the second user. Lastly, the first user may utilize a social-media application to post the photos and then users with a connection to the internet may view the social-media profile of the first user to view the photos.

However, all of the above-mentioned ways to share media have downfalls. For example, physically providing the first device to the second user leaves the first user without control of what the second user will do with the first device, potentially scrolling to photos that the first user does not intend the second user to see. Additionally, having the second user come close to the first user may be uncomfortable for one or more of the users. Furthermore, sending media to the second device means the photos cannot be retrieved or otherwise controlled by the first user. Lastly, the use of social-media applications causes the photos to be made available to a wider range of people and/or requires the use of the internet to perform such sharing.

The present innovation addresses the drawbacks of current systems and methods by, for example, allowing a first device to temporarily cause a display of a second device that is within a certain geographic area of the first device to present media on the second device. For example, a first instance of an application may be downloaded or otherwise accessed on the first device, and a second instance of the application may be downloaded or otherwise accessed on the second device. The application may allow for media sharing between devices. A first user of the first device may utilize the application to share media with a second user of the second device. For example, a user interface of the application may present an option to share or view media. The first user may select a portion of a screen of the first device corresponding to a share icon. Based at least in part on selecting the share icon, the first device may broadcast a signal over a certain geographic area around the first device. The geographic area, for example may be a number of feet, such as from about 0.1 feet to about 25 feet from the first device. The second user may select a portion of a screen of the second device corresponding to a view icon. Based at least in part on selecting the view icon, the second device may receive the signal broadcasted by the first device.

Authentication of the viewer device may then be performed. For example, the second device may transmit data to the first device indicating that the second device is requesting to establish a peer-to-peer network with the first device. The data may be received at the first device, which may cause the user interface to display a notification that the second device is requesting permission to view media from the first device. The first user may select a portion of the screen of the first device corresponding to acceptance of the second device for purposes of media sharing, and a peer-to-peer network may be established between the first device and the second device. In these examples, a transceiver in each of the devices may be configured and permitted to send data back and forth between the devices, and the application and/or other components of the devices may be configured to encrypt and/or decrypt the data sent between devices.

In other examples, based at least in part on the first user selecting the share icon, the user interface of the first device may display a code, such as a code containing one or more letters and/or numbers, on the screen of the first device. The first user may then show the first device to the second user and/or the first user may speak the code to the second user. Based at least in part on the second user selecting the view icon, the user interface of the second device may display a keypad and one or more fields for entering the code. The second user may enter the code and the second device may transmit data to the first device indicating the code as input by the second user. In instances where the code input by the second user corresponds to the code displayed on the first device, the peer-to-peer network may be established. It should be understood that while examples of authentication techniques have been provided herein, this disclosure includes any authentication methodology.

Once the network is established between the first device and the second device, the user interface of the first device may provide an indication that the second device is viewing media shared by the first device. This indication may correspond to an icon on the user interface that indicates a number of viewer devices currently viewing media shared by the first device. The icon may be selectable and, when selected, may cause the user interface of the first device to display a naming indicator for some or all of the viewer devices. By so doing, the first user may determine which devices are currently connected to the first device via the network. The user interface may include functionality that allows the first user to disconnect from one or more of the viewer devices and/or control what information is displayed to given viewer devices.

The first device may then share media, such as photos, with the viewer devices. For example, the first user may utilize the user interface of the first device to access a database of the first device and then select which media to share. In examples, the first user may select multiple photos and the first device may generate a group of the selected photos. By way of example, the first user may select photos associated with a given event, such as a vacation, and generate a group with the selected photos. Additional methods of generating groups of media and/or selecting media to be associated with a group may be utilized. For example, searching functionality may be provided in the user interface to allow the user to search for media associated with a given event, time, time range, location, and/or depiction of given objects in the media, such as a given person and/or landscape.

To share media, the first user may select media from the database and/or may select a given group of media to share. The user interface may be utilized to receive input from the first user to select a given portion of the media to share and an icon may be presented via the user interface to confirm that the first user has indicated that the selected media should be shared. Based at least in part on receiving the user's input to share the media, an instance of the media may be transmitted from the first device to the one or more viewer devices. The viewer devices, having established the peer-to-peer network with the first device, may have their functionality limited while the network is established. For example, the functionality of a viewer device may be limited to only receiving media data from the first device, displaying the shared media, allowing the user of the viewer device to provide input for zooming, panning, tilting, or otherwise changing a view of the shared media, and/or allowing the user of the viewer device to exit the application. Other functionality, such as copying the media, storing the media to memory of the viewer device, and/or accessing other applications on the viewer device may be disabled. In these examples, when a user of the viewer device exits the application, the peer-to-peer network may be disabled and sharing of the media data may cease. Additionally, when the first device stops sharing media and/or switches between various media, commiserate changes occur on the viewer device. In this way, the first device may share the media with the viewer device(s) but the media may not be saved to the viewer device and the user of the viewer device may not have control of what media is displayed on the viewer device. If a user of the viewer device provides input to the viewer device that indicates a nefarious intent to store the media data and/or to utilize the media data in an unauthorized way, the application on the viewer device may send a notification of such an action to the first device.

Additionally, or alternatively, the first user may modify media being shared and/or to be shared with the viewer device(s). For example, the user interface of the first device may include functionality that allows the first user to add, remove, and/or modify the media data. By way of example, the first user may crop the media, change colors associated with the media, add text data, add media data such as shapes, markings, highlighting, etc., and/or associate the media data with other media data. The modified media data may be shared with the viewer devices, and in instances where the media data is currently being shared with the viewer devices, the first device may send data indicating the modifications in real time or near real time to the viewer devices to cause the viewer devices to display modified media as the modifications are being made by the first user on the first device.

When the first user desires to stop sharing media, the first user may provide an indication of this intent utilizing the user interface and the peer-to-peer network may be terminated such that media data may cease being shared between devices. Thereafter, additional sharing sessions may be commenced utilizing the applications. For example, the first device may initiate another sharing session and/or the first device may become a viewer device when another device initiates a sharing session. The systems and methods described herein may be utilized to share media data between two or more devices for recreational and/or business purposes. For example, two friends and/or acquaintances may share photos. In other examples, a business and/or personal meeting may be held utilizing the application(s) such that a presenter may present a presentation, which may be displayed on the viewer devices of other participants of the meeting.

The present disclosure provides an overall understanding of the principles of the structure, function, manufacture, and use of the systems and methods disclosed herein. One or more examples of the present disclosure are illustrated in the accompanying drawings. Those of ordinary skill in the art will understand that the systems and methods specifically described herein and illustrated in the accompanying drawings are non-limiting embodiments. The features illustrated or described in connection with one embodiment may be combined with the features of other embodiments, including as between systems and methods. Such modifications and variations are intended to be included within the scope of the appended claims.

Additional details are described below with reference to several example embodiments.

FIG. 1 illustrates a schematic diagram of an example system 100 for live proximity-based media transfer. The system 100 may include, for example, a first device 102, otherwise described herein as a sharing device 102. The system 100 may also include, for example, a second device 104, otherwise described herein as a viewer device 104. It should be understood that while two devices are shown herein, the system 100 may include two or more than two devices. The first device 102 and second device 104 may include a mobile phone, tablet, laptop, and/or other computing device. The devices 102, 104 may be configured to send data to and/or receive data from each other, such as via a network 106.

The first device 102 may include components such as one or more processors 108, one or more network interfaces 110, memory 112, one or more displays 114, one or more transceivers 116, and/or a global positioning system (GPS) component 118. The memory 112 may include one or more components, such as, for example, a first instance of an application 120. The displays 114 may be configured to display text and/or images and may be utilized to surface one or more user interfaces, such as user interfaces associated with the application 120. The transceivers 116 may be configured to receive data, such as from the viewer device 104 and/or to send data, such as to the viewer device 104. The GPS component 118 may be utilized to determine a geographic position of the sharing device 102 and/or to generate location data associated with the geographic position of the sharing device 102. In other examples, the proximity may be determined utilizing the transceivers 116 and/or the range of a particular network associated with the device 102. The application 120 may be configured to surface user interfaces for temporary sharing of media as described herein.

The second device 102 may include components such as one or more processors 122, one or more network interfaces 124, memory 126, one or more displays 128, one or more transceivers 130, and/or a GPS component 132. The memory 126 may include components such as, for example, a second instance of the application 120. The displays 128 may perform the same or similar functionality as the displays 114 described with respect to the first device 102. The transceivers 130 may perform the same or similar functionality as the transceivers 116 described with respect to the first device 102. The GPS component 132 may perform the same or similar functionality as the GPS component 118 described with respect to the first device 102. In other examples, the proximity may be determined utilizing the transceivers 130 and/or the range of a particular network associated with the device 104. The second instance of the application 120 may perform the same or similar sharing functionality as described with respect to the first instance of the application 120 and/or may perform viewing functionality as described herein.

To illustrate the functionality of the application 120, the following provides an example of temporary media sharing. It should be understood that the examples provided below are for illustration and are not by way of limitation. For example, the first instance of the application 120 may be downloaded or otherwise accessed on the first device 102, and the second instance of the application 120 may be downloaded or otherwise accessed on the second device 104. The application 120 may allow for media sharing between devices 102, 104. A first user of the first device 102 may utilize the application to share media with a second user of the second device 104. For example, a user interface of the application 120 may present an option to share or view media. The first user may select a portion of a display 114 of the first device 102 corresponding to a share icon. Based at least in part on selecting the share icon, the first device 102 may broadcast a signal over a certain geographic area around the first device 102, such as by utilizing the GPS component 118 and the transceiver 116. The geographic area, for example may be a number of feet, such as from about 0.1 feet to about 25 feet from the first device 102. In other examples, the geographic area may be configurable, such as by the user and based on the circumstances and/or environment. For example, if the users are located in a large open area, the geographic area may be decreased such that only users close to the first user may receive the signal. In other examples, such as when the devices 102, 104 are being utilized in a meeting where all or nearly all devices in a conference room are desired to receive the signal, the geographic area may be increased. The second user may select a portion of the display 128 of the second device 104 corresponding to a view icon. Based at least in part on selecting the view icon, the second device 104 may receive the signal broadcasted by the first device 102.

Authentication of the second device 104 may then be performed. For example, the viewer device 104 may transmit data to the first device 102 indicating that the viewer device 102 is requesting to establish a peer-to-peer network 106 with the first device 102. The data may be received at the first device 102, which may cause the user interface to display a notification that the viewer device 104 is requesting permission to view media from the first device 102. The first user may select a portion of the display 114 of the first device 102 corresponding to acceptance of the viewer device 104 for purposes of media sharing, and a peer-to-peer network 106 may be established between the first device 102 and the second device 104. In these examples, the transceiver 116, 130 in each of the devices 102, 104 may be configured and permitted to send data back and forth between the devices 102, 104, and the application 120 and/or other components of the devices 102, 104 may be configured to encrypt and/or decrypt the data sent between devices 102, 104.

In other examples, based at least in part on the first user selecting the share icon, the user interface of the first device 102 may display a code, such as a code containing one or more letters and/or numbers, on the display 114 of the first device 102. The first user may then show the first device 102 to the second user and/or the first user may speak the code to the second user. Based at least in part on the second user selecting the view icon, the user interface of the second device 104 may display a keypad and one or more fields for entering the code. The second user may enter the code and the second device 104 may transmit data to the first device 102 indicating the code as input by the second user. In instances where the code input by the second user corresponds to the code displayed on the first device 102, the peer-to-peer network 106 may be established. It should be understood that while examples of authentication techniques have been provided herein, this disclosure includes any authentication methodology.

Once the network 106 is established between the first device 102 and the second device 104, the user interface of the first device 102 may provide an indication that the second device 104 is viewing media shared by the first device 102. This indication may correspond to an icon on the user interface that indicates a number of viewer devices currently viewing media shared by the first device 102. The icon may be selectable and, when selected, may cause the user interface of the first device 102 to display a naming indicator for some or all of the viewer devices 104. By so doing, the first user may determine which devices are currently connected to the first device 102 via the network 106. The user interface may include functionality that allows the first user to disconnect from one or more of the viewer devices 104 and/or control what information is displayed to given viewer devices 104.

The first device 102 may then share media, such as photos, with the viewer devices 104. For example, the first user may utilize the user interface of the first device 102 to access a database of the first device 102 and then select which media to share. In examples, the first user may select multiple photos and the first device 102 may generate a group of the selected photos. By way of example, the first user may select photos associated with a given event, such as a vacation, and generate a group with the selected photos. Additional methods of generating groups of media and/or selecting media to be associated with a group may be utilized. For example, searching functionality may be provided in the user interface to allow the user to search for media associated with a given event, time, time range, location, and/or depiction of given objects in the media, such as a given person and/or landscape.

To share media, the first user may select media from the database and/or may select a given group of media to share. The user interface may be utilized to receive input from the first user to select a given portion of the media to share and an icon may be presented via the user interface to confirm that the first user has indicated that the selected media should be shared. Based at least in part on receiving the user's input to share the media, an instance of the media may be transmitted from the first device 102 to the one or more viewer devices 104. The viewer device 104, having established the peer-to-peer network 106 with the first device 102, may have its functionality limited while the network 106 is established. For example, the functionality of the viewer device 104 may be limited to only receiving media data from the first device 102, displaying the shared media, allowing the user of the viewer device 104 to provide input for zooming, panning, tilting, or otherwise changing a view of the shared media, and/or allowing the user of the viewer device 104 to exit the application. Other functionality, such as copying the media, storing the media to memory 126 of the viewer device 104, and/or accessing other applications on the viewer device 104 may be disabled. In these examples, when a user of the viewer device 104 exits the application 120, the peer-to-peer network 106 may be disabled and sharing of the media data may cease. Additionally, when the first device 102 stops sharing media and/or switches between various media, commiserate changes occur on the viewer device 104. In this way, the first device 102 may share the media with the viewer device(s) 104 but the media may not be saved to the viewer device 104 and the user of the viewer device 104 may not have control of what media is displayed on the viewer device 104. If a user of the viewer device 104 provides input to the viewer device 104 that indicates a nefarious intent to store the media data and/or to utilize the media data in an unauthorized way, the application 120 on the viewer device 104 may send a notification of such an action to the first device 102.

Additionally, or alternatively, the first user may modify media being shared and/or to be shared with the viewer device(s) 104. For example, the user interface of the first device 102 may include functionality that allows the first user to add, remove, and/or modify the media data. By way of example, the first user may crop the media, change colors associated with the media, add text data, add media data such as shapes, markings, highlighting, etc., and/or associate the media data with other media data. The modified media data may be shared with the viewer devices 104, and in instances where the media data is currently being shared with the viewer devices 104, the first device 102 may send data indicating the modifications in real time or near real time to the viewer devices 104 to cause the viewer devices 104 to display modified media as the modifications are being made by the first user on the first device 102.

When the first user desires to stop sharing media, the first user may provide an indication of this intent utilizing the user interface and the peer-to-peer network 106 may be terminated such that media data may cease being shared between devices 102, 104. Thereafter, additional sharing sessions may be commenced utilizing the applications. For example, the first device 102 may initiate another sharing session and/or the first device 102 may become a viewer device 104 when another device initiates a sharing session.

The systems and methods described herein may be utilized to share media data between two or more devices for recreational and/or business purposes. For example, two friends and/or acquaintances may share photos. In other examples, a business and/or personal meeting may be held utilizing the application(s) such that a presenter may present a presentation, which may be displayed on the viewer devices of other participants of the meeting.

It should be noted that while image data is described as a type of data shared between devices 102, 104, any data may be shared. For example, media data may include image data, text data, video data, and/or live-image data, for example. The data may be in a human-readable format, such as text data formatted as XML, SSML, and/or other markup language, or in a computer-readable format, such as binary, hexadecimal, etc., which may be converted to text data for display by one or more devices.

Additionally, while the network 106 described herein is described by way of example as a peer-to-peer network, additional and/or alternative networks may be established. For example, a wide-area network that utilizes the internet and/or one or more servers may be utilized. In other examples, the network may be established utilizing one or more protocols such as Bluetooth and/or Bluetooth Low Energy.

It should be noted that the exchange of data and/or information as described herein may be performed only in situations where a user has provided consent for the exchange of such information. For example, upon setup of devices and/or initiation of applications, a user may be provided with the opportunity to opt in and/or opt out of data exchanges between devices and/or for performance of the functionalities described herein. Additionally, when one of the devices is associated with a first user account and another of the devices is associated with a second user account, user consent may be obtained before performing some, any, or all of the operations and/or processes described herein. Additionally, the operations performed by the components of the systems described herein may be performed only in situations where a user has provided consent for performance of the operations. In other examples, consent may be inferred when previous sharing sessions occur and/or consent requirements may not be utilized.

As used herein, a processor, such as processor(s) 108 and/or 122, may include multiple processors and/or a processor having multiple cores. Further, the processors may comprise one or more cores of different types. For example, the processors may include application processor units, graphic processing units, and so forth. In one implementation, the processor may comprise a microcontroller and/or a microprocessor. The processor(s) 108 and/or 122 may include a graphics processing unit (GPU), a microprocessor, a digital signal processor or other processing units or components known in the art. Alternatively, or in addition, the functionally described herein can be performed, at least in part, by one or more hardware logic components. For example, and without limitation, illustrative types of hardware logic components that can be used include field-programmable gate arrays (FPGAs), application-specific integrated circuits (ASICs), application-specific standard products (ASSPs), system-on-a-chip systems (SOCs), complex programmable logic devices (CPLDs), etc. Additionally, each of the processor(s) 108 and/or 122 may possess its own local memory, which also may store program components, program data, and/or one or more operating systems.

The memory 112 and/or 126 may include volatile and nonvolatile memory, removable and non-removable media implemented in any method or technology for storage of information, such as computer-readable instructions, data structures, program component, or other data. Such memory 112 and/or 126 includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device. The memory 112 and/or 126 may be implemented as computer-readable storage media ("CRSM"), which may be any available physical media accessible by the processor(s) 108 and/or 122 to execute instructions stored on the memory 112 and/or 126. In one basic implementation, CRSM may include random access memory ("RAM") and Flash memory. In other implementations, CRSM may include, but is not limited to, read-only memory ("ROM"), electrically erasable programmable read-only memory ("EEPROM"), or any other tangible medium which can be used to store the desired information and which can be accessed by the processor(s).

Further, functional components may be stored in the respective memories, or the same functionality may alternatively be implemented in hardware, firmware, application specific integrated circuits, field programmable gate arrays, or as a system on a chip (SoC). In addition, while not illustrated, each respective memory, such as memory 112 and/or 126, discussed herein may include at least one operating system (OS) component that is configured to manage hardware resource devices such as the network interface(s), the I/O devices of the respective apparatuses, and so forth, and provide various services to applications or components executing on the processors. Such OS component may implement a variant of the FreeBSD operating system as promulgated by the FreeBSD Project; other UNIX or UNIX-like variants; a variation of the Linux operating system as promulgated by Linus Torvalds; the FireOS operating system from Amazon. com Inc. of Seattle, Wash., USA; the Windows operating system from Microsoft Corporation of Redmond, Wash., USA; LynxOS as promulgated by Lynx Software Technologies, Inc. of San Jose, Calif.; Operating System Embedded (Enea OSE) as promulgated by ENEA AB of Sweden; macOS and iOS as promulgated by Apple, Inc.; and so forth.

The network interface(s) 110 and/or 124 may enable messages between the components and/or devices shown in system 100 and/or with one or more other polling systems, as well as other networked devices. Such network interface(s) 110 and/or 124 may include one or more network interface controllers (NICs) or other types of transceiver devices to send and receive messages over the network 108.

For instance, each of the network interface(s) 110 and/or 124 may include a personal area network (PAN) component to enable messages over one or more short-range wireless message channels. For instance, the PAN component may enable messages compliant with at least one of the following standards IEEE 802.15.4 (ZigBee), IEEE 802.15.1 (Bluetooth), IEEE 802.11 (WiFi), or any other PAN message protocol. Furthermore, each of the network interface(s) 110 and/or 124 may include a wide area network (WAN) component to enable message over a wide area network.

Figure 2:
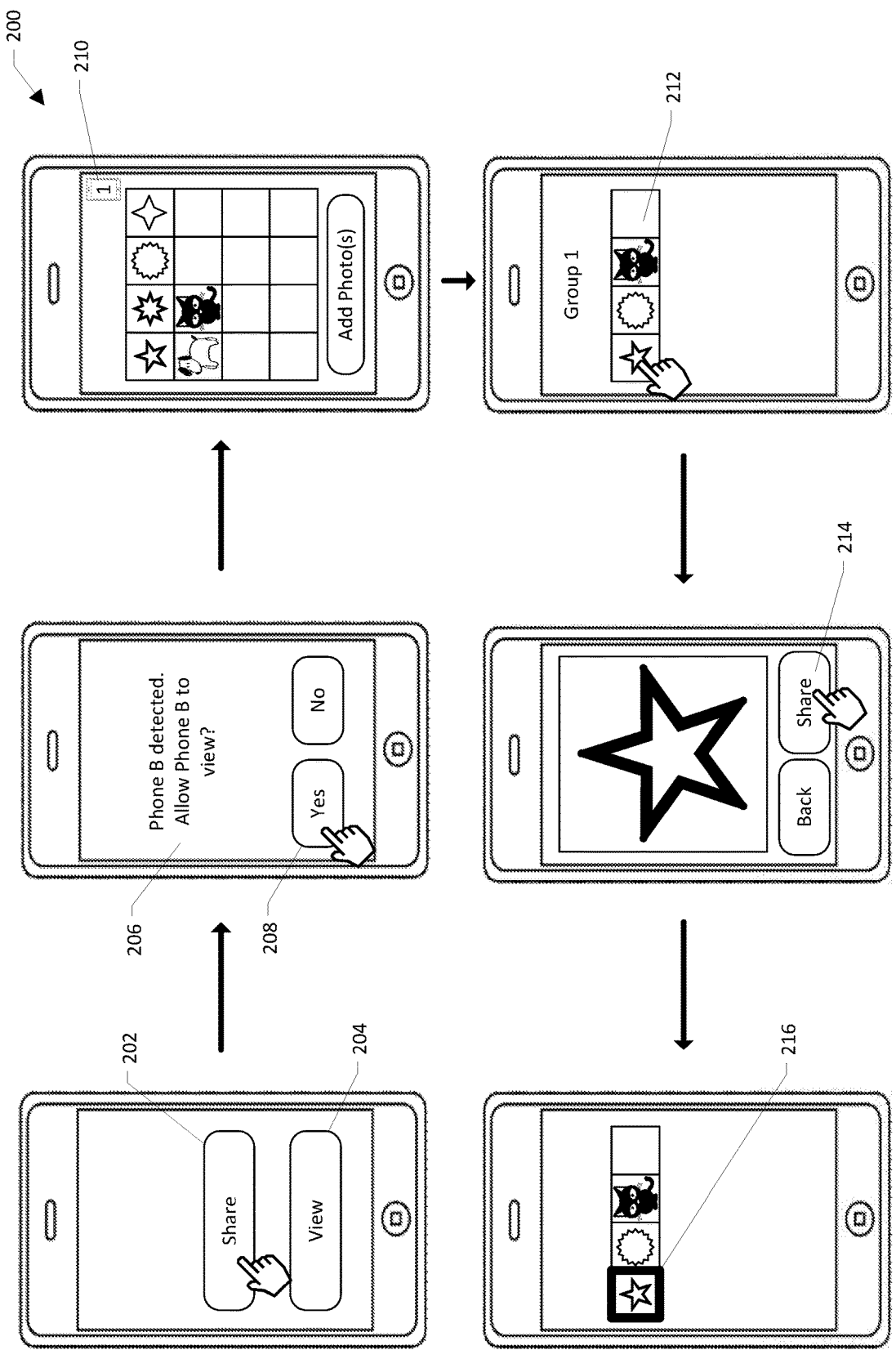
FIG. 2 illustrates a conceptual diagram of an example user interface for a sharing device used for live proximity-based media transfer.

FIG. 2 illustrates a conceptual diagram of an example user interface 200 for a sharing device used for live proximity-based media transfer. The user interface 200 is depicted in a progression from left to right and from top to bottom as operations are performed by the device on which the user interface is displayed. The user interface 200 may be associated with an application residing on and/or accessible to the device and utilized for live proximity-based media transfer to one or more other devices.

For example, the user interface 200 may include a share icon 202 and a view icon 204. For example, a first user of the device may utilize the application to share media with a second user of a second device. The user may select a portion of a display of the device corresponding to the share icon 202. Based at least in part on selecting the share icon 202, the device may broadcast a signal over a certain geographic area around the device. A second user may select a portion of the display of another device corresponding to the view icon 204. Based at least in part on selecting the view icon 204, the other device may receive the signal broadcasted by the first device.

Authentication of the other device may then be performed. For example, the other device may transmit data to the first device indicating that the other device is requesting to establish a peer-to-peer network with the first device. The data may be received at the first device, which may cause the user interface to display a notification 206 that the other device is requesting permission to view media from the first device. The first user may select a "Yes" portion 208 of the display of the first device corresponding to acceptance of the other device for purposes of media sharing, and a peer-to-peer network may be established between the first device and the second device. In these examples, a transceiver in each of the devices may be configured and permitted to send data back and forth between the devices, and the application and/or other components of the devices may be configured to encrypt and/or decrypt the data sent between devices.

Once the network is established between the first device and the second device, the user interface 200 may provide an indication 210 that the second device is viewing media shared by the first device. This indication may correspond to an icon on the user interface 200 that indicates a number of viewer devices currently viewing media shared by the first device. The first device may then share media, such as photos, with the second device. For example, the first user may utilize the user interface 200 to access a database of the first device and then select which media to share. In examples, the first user may select multiple photos and the first device may generate a group 212 of the selected photos. By way of example, the first user may select photos associated with a given event, such as a vacation, and generate a group 212 with the selected photos. Additional methods of generating groups 212 of media and/or selecting media to be associated with a group 212 may be utilized. For example, searching functionality may be provided in the user interface to allow the user to search for media associated with a given event, time, time range, location, and/or depiction of given objects in the media, such as a given person and/or landscape.

To share media, the first user may select media from the database and/or may select a given group 212 of media to share. The user interface 200 may be utilized to receive input from the first user to select a given portion of the media to share. Using FIG. 2 as an example, the user has selected the photograph of a five-pointed star. A confirmation icon 214 may be presented via the user interface 200 to confirm that the first user has indicated that the selected media should be shared. Based at least in part on receiving the user's input to share the media, an instance of the media may be transmitted from the first device to the one or more viewer devices.

The user interface 200 may then provide an indication to the first user of which portion of the media is being shared with viewer devices. For example, an emphasis 216, such as shading, highlighting, circling, bolding, etc. may be displayed on the user interface 200 in a manner that shows the portion of media data being shared. The user may then select additional portions of the media to share and upon confirming intent to share, the emphasis 216 may be transitioned to the additional portion of the media. The media displayed on the second device may change as the media selected on the first device is changed.

Figure 3:
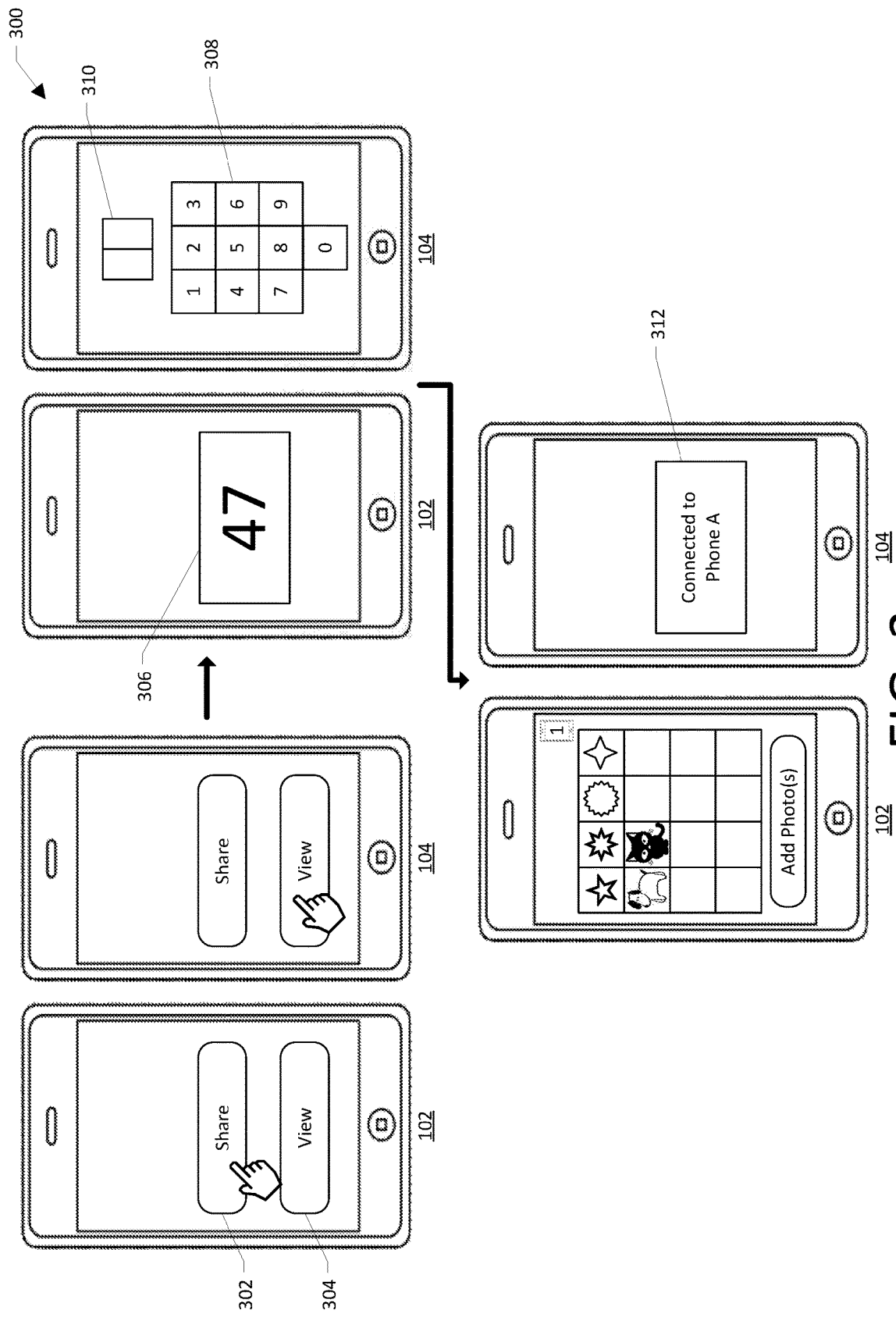
FIG. 3 illustrates a conceptual diagram of an example user interface for device authentication during live proximity-based media transfer.

FIG. 3 illustrates a conceptual diagram of an example user interface 300 for device authentication during live proximity-based media transfer. The user interface 300 is depicted in a progression from left to right and from top to bottom as operations are performed by the device on which the user interface is displayed. The user interface 300 may be associated with an application residing on and/or accessible to the device and utilized for live proximity-based media transfer to one or more other devices.

For example, the user interface 300 may include a share icon 302 and a view icon 304. For example, a first user of the first device 102 may utilize the application to share media with a second user of the second device 104. The user may select a portion of a display of the first device 102 corresponding to the share icon 302. Based at least in part on selecting the share icon 302, the first device 102 may broadcast a signal over a certain geographic area around the first device 102. A second user may select a portion of the display of the second device 104 corresponding to the view icon 304. Based at least in part on selecting the view icon 304, the second device 104 may receive the signal broadcasted by the first device 102.

Authentication of the second device 104 may then be performed. For example, based at least in part on the first user selecting the share icon 302, the user interface 300 of the first device 102 may display a code 306, such as a code 306 containing one or more letters and/or numbers, on the display of the first device 102. The first user may then show the first device 102 to the second user and/or the first user may speak the code to the second user. Based at least in part on the second user selecting the view icon 304, the user interface 300 of the second device 104 may display a keypad 308 and one or more fields 310 for entering the code 306. The second user may enter the code 306 and the second device 104 may transmit data to the first device 102 indicating the code 306 as input by the second user. In instances where the code 306 input by the second user corresponds to the code 306 displayed on the first device 102, the peer-to-peer network may be established. It should be understood that while examples of authentication techniques have been provided herein, this disclosure includes any authentication methodology.

Once the network is established between the first device 102 and the second device 104, the first device 102 may share media, such as photos, with the second device 104. For example, the first user may utilize the user interface 300 to access a database of the first device and then select which media to share. A connection indicator 312 may be displayed on the second device 104 to indicate to the user of the second device 104 that the network has been established and the user interface 300 is waiting to receive input from the first device 102 associated with the media to be shared.

Figure 4:
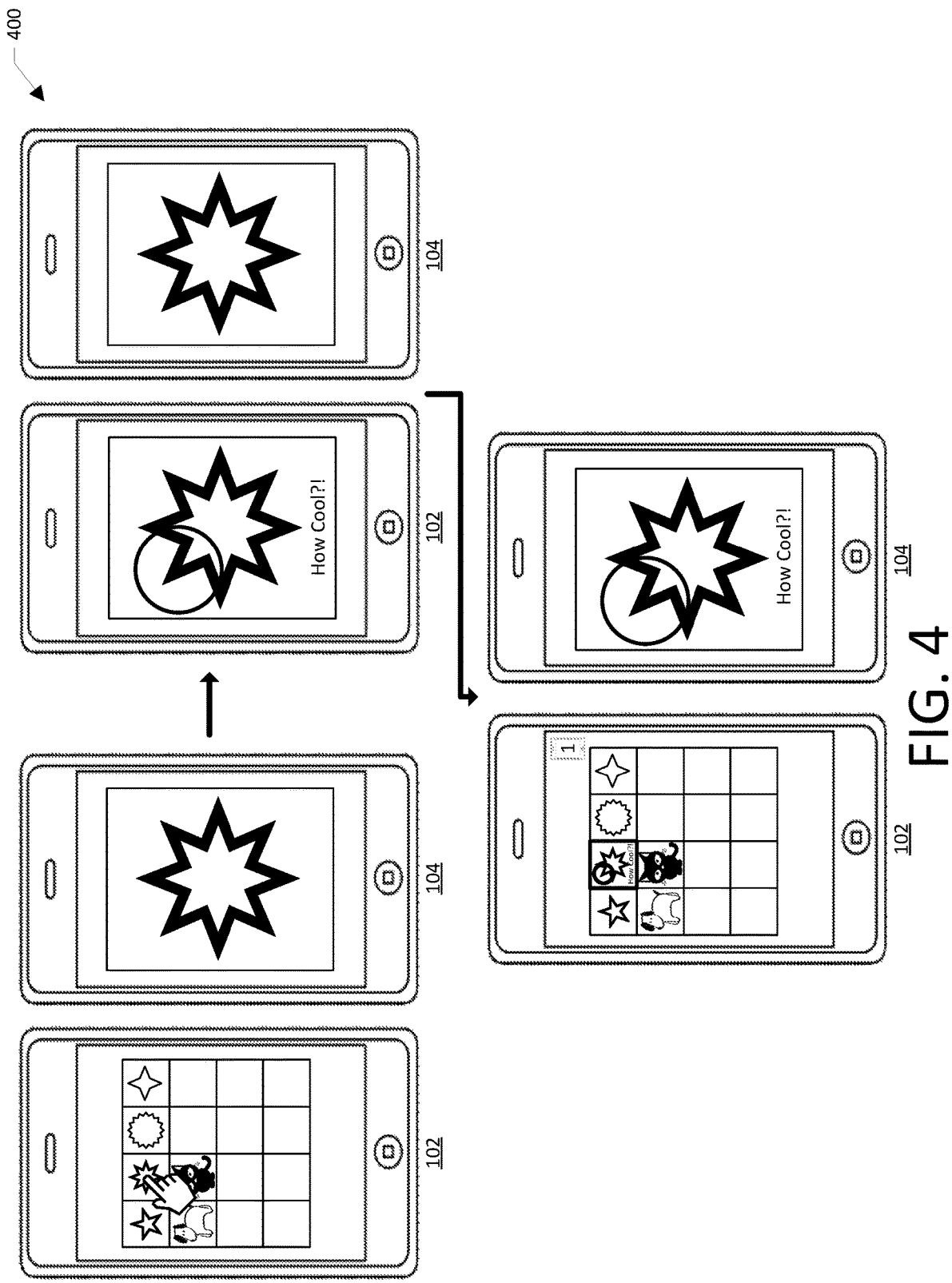
FIG. 4 illustrates a conceptual diagram of an example user interface for media modification during live proximity-based media transfer.

FIG. 4 illustrates a conceptual diagram of an example user interface 400 for media modification during live proximity-based media transfer. The user interface 400 is depicted in a progression from left to right and from top to bottom as operations are performed by the device on which the user interface is displayed. The user interface 400 may be associated with an application residing on and/or accessible to the device and utilized for live proximity-based media transfer to one or more other devices.

A user of a first device 102 may select a portion of the screen of the first device 102 corresponding to media to be shared with a second device 104. Media data corresponding to the media may be sent to the second device 104 for display on the second device 104. Additionally, a user of the first device 102 may provide input corresponding to a modification of the media being shared with the second device 104. For example, the user interface 400 of the first device 102 may include functionality that allows the first user to add, remove, and/or modify the media data. By way of example, the first user may crop the media, change colors associated with the media, add text data, add media data such as shapes, markings, highlighting, etc., and/or associate the media data with other media data. The modified media data may be shared with the second device 104, and in instances where the media data is currently being shared with the second devices 104, the first device 102 may send data indicating the modifications in real time or near real time to the second device 104 to cause the second device 104 to display modified media as the modifications are being made by the first user on the first device 102.

By way of example, as shown in FIG. 4, the user may select the eight-pointed star as media to be shared with the second device 104. Upon confirming that the media should be shared, the media data corresponding to the eight-pointed star may be transmitted to the second device 104, where the image may be displayed. Thereafter, the user of the first device 102 may modify the media, such as by adding a circle to emphasize a certain portion of the media and/or including text such as "How Cool?!" When the user indicates that the modifications are complete, such as by pressing a portion of the screen corresponding to a save icon and/or an update icon and/or a share icon, the modified media data may be sent to the second device 104 and may be displayed on the second device 104. The first device 102 may display the media modifications in the user interface 400 with the other portions of the media, such as the other photos.

Figure 5:
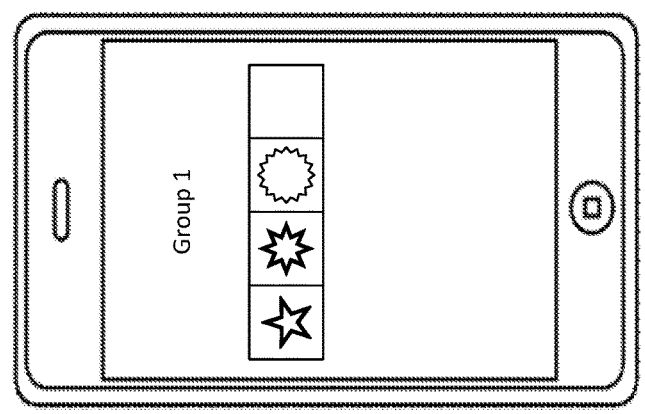
FIG. 5 illustrates a conceptual diagram of an example user interface for media grouping associated with live proximity-based media transfer.
Figure 5:
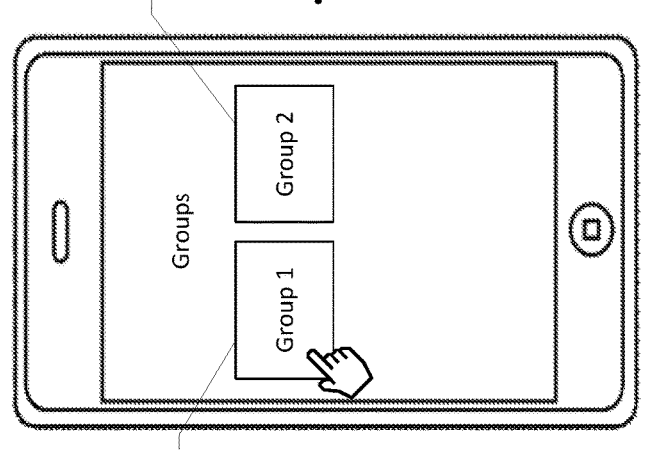
Figure 5:
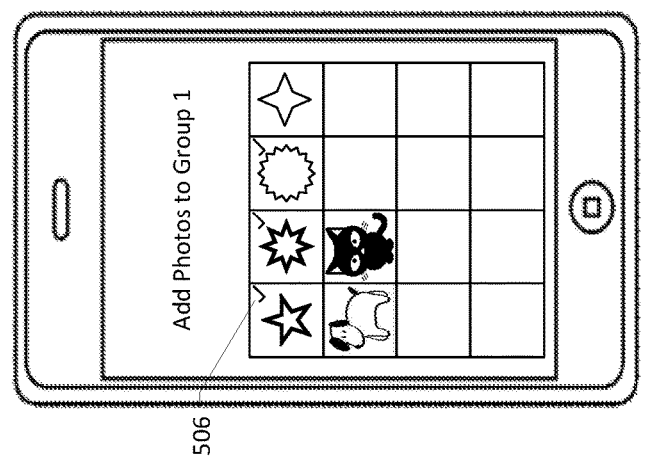

FIG. 5 illustrates a conceptual diagram of an example user interface for media grouping during live proximity-based media transfer. The user interface 500 is depicted in a progression from left to right as operations are performed by the device on which the user interface is displayed. The user interface 500 may be associated with an application residing on and/or accessible to the device and utilized for live proximity-based media transfer to one or more other devices.

In examples, the first user may select multiple photos and the first device 102 may generate a group 502, 504 of the selected photos. By way of example, the first user may select photos associated with a given event, such as a vacation, and generate a group 502 with the selected photos. Additional methods of generating groups 502, 504 of media and/or selecting media to be associated with a group may be utilized. For example, searching functionality may be provided in the user interface to allow the user to search for media associated with a given event, time, time range, location, and/or depiction of given objects in the media, such as a given person and/or landscape.

The user interface 500 may be utilized to select the media from the database or other database. An indicator 506 that a portion of the media has been selected may be displayed such that the user may be presented with visual confirmation of the media being selected for a group. Once selected, the group may be named, such as Group 1 or Group 2, and the user interface 500 may display a thumbnail of the groups 502, 504. The thumbnails may be selectable such that when selected the media associated with the selected group 502, 504 may be displayed via the user interface 500. A user of the first device 102 may then provide input to share a given portion of the media associated with the selected group and/or the user may indicate that all media associated with the selected group is to be shared with the viewer device(s).

Figure 6:
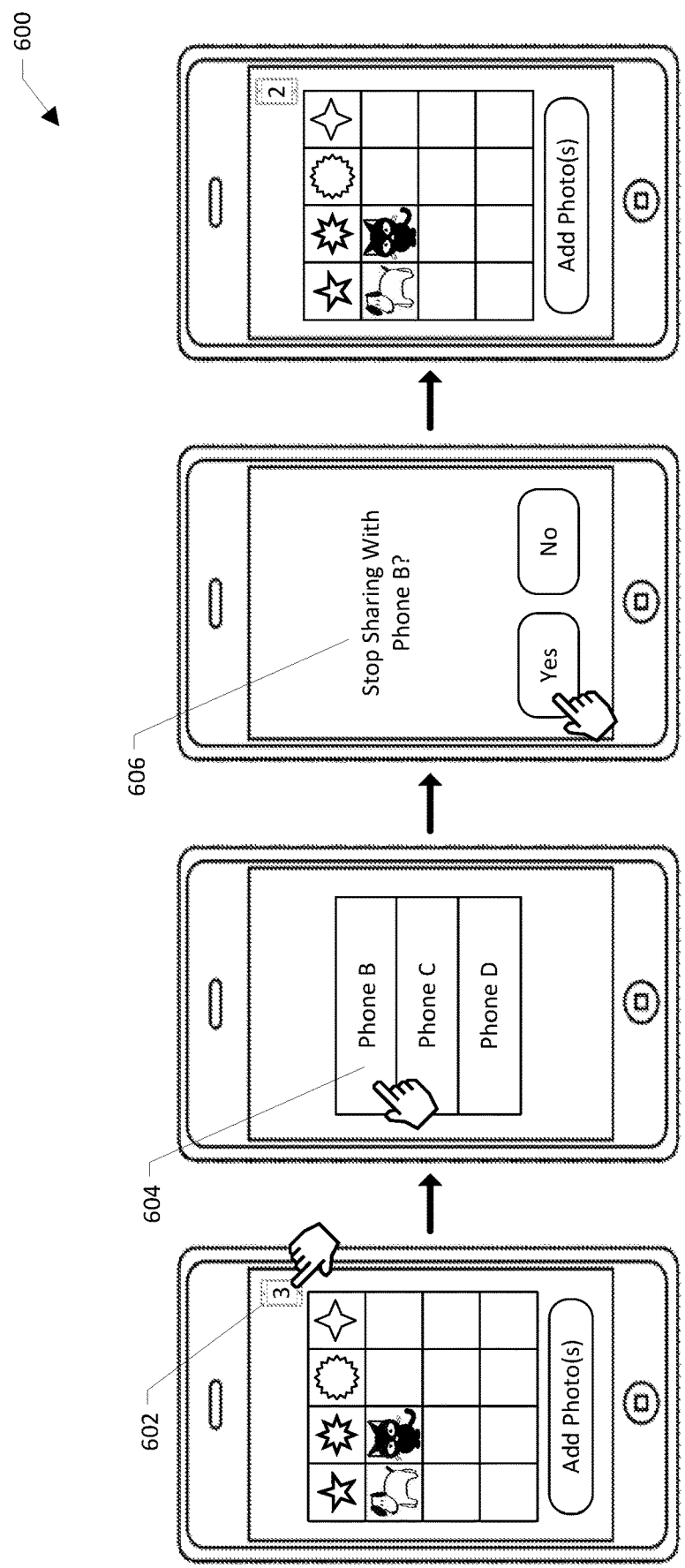
FIG. 6 illustrates a conceptual diagram of an example user interface for viewer device indications and control during live proximity-based media transfer.

FIG. 6 illustrates a conceptual diagram of an example user interface for viewer device indications and control during live proximity-based media transfer. The user interface 600 is depicted in a progression from left to right as operations are performed by the device on which the user interface is displayed. The user interface 600 may be associated with an application residing on and/or accessible to the device and utilized for live proximity-based media transfer to one or more other devices.

The user interface 600 depicts functionality for controlling which viewer devices to share media with during a given sharing session. For example, once the network is established between the first device and the viewer device(s), the user interface 600 of the first device may provide an indication that the second device is viewing media shared by the first device. This indication may correspond to an icon 602 on the user interface that indicates a number of viewer devices currently viewing media shared by the first device. The icon 602 may be selectable and, when selected, may cause the user interface 600 of the first device to display a naming indicator 604 for some or all of the viewer devices. By so doing, the first user may determine which devices are currently connected to the first device via the network.

Additionally, upon selection of a given naming indicator 604, a notification 606 may be displayed via the user interface 600 that requests whether the user would like to stop sharing with the device corresponding to the given viewer device. If the user confirms that sharing should be stopped, the network may cease between the first device and that viewer device. In these examples, given that one of the viewer devices has been dropped from the network, the icon 602 may present a different number of viewer devices, such as one less device in this example.

Using FIG. 6 as an example, the icon 602 shows three viewer devices at the outset of the sharing session. The user may select the icon 602 to display the naming indicators 604 for the three viewer devices, here Phone B, Phone C, and Phone D. Upon selection of one of the naming indicators 603, the notification 606 may be displayed. Here, the notification 606 is "Stop sharing with Phone B?" Upon selecting "yes," the network between Phone B and the first device may be terminated and the icon 2 may be reset to show two viewer devices for the sharing session.

Figure 7:
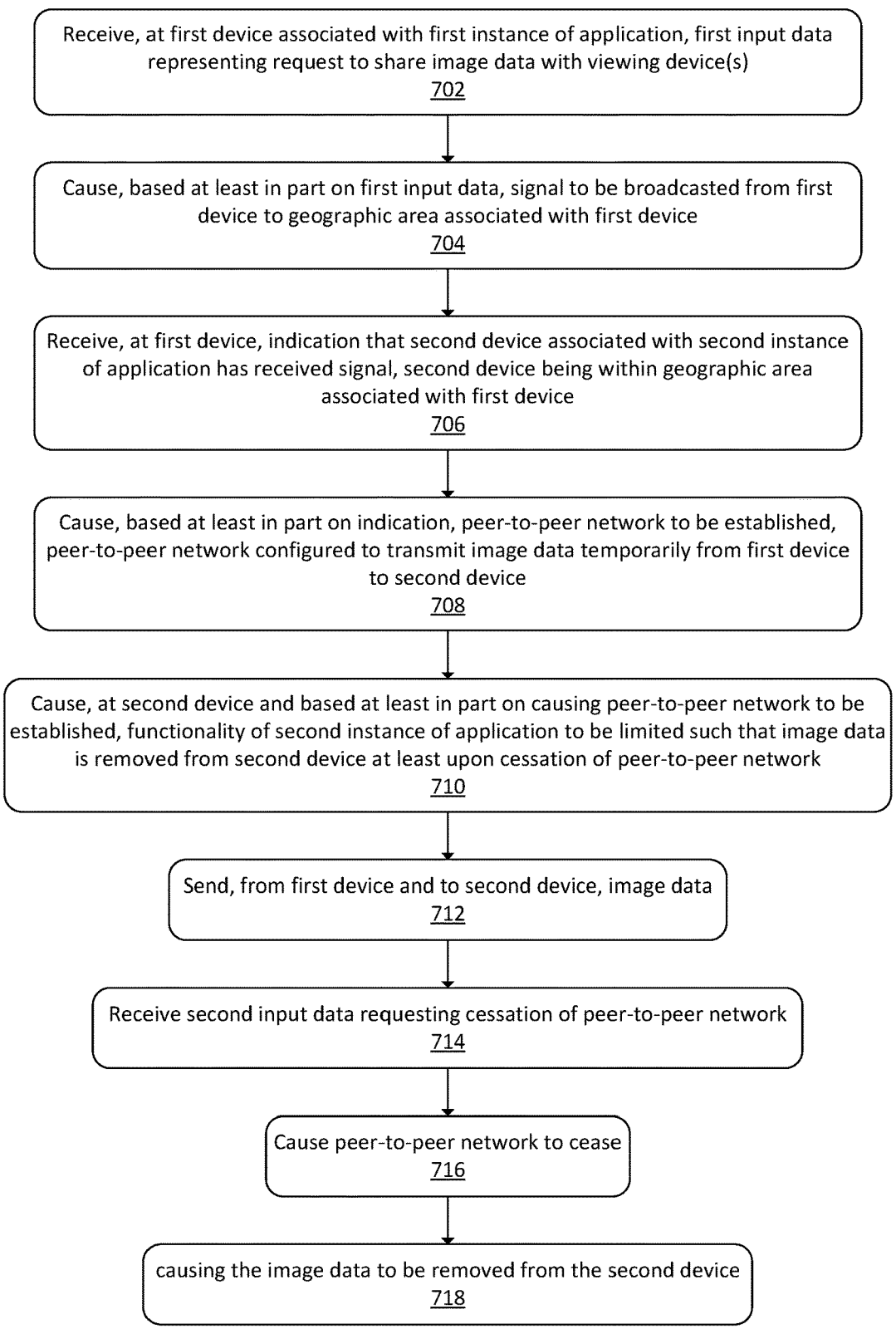
FIG. 7 illustrates a flow diagram of an example process for live proximity-based media transfer.
Figure 8:
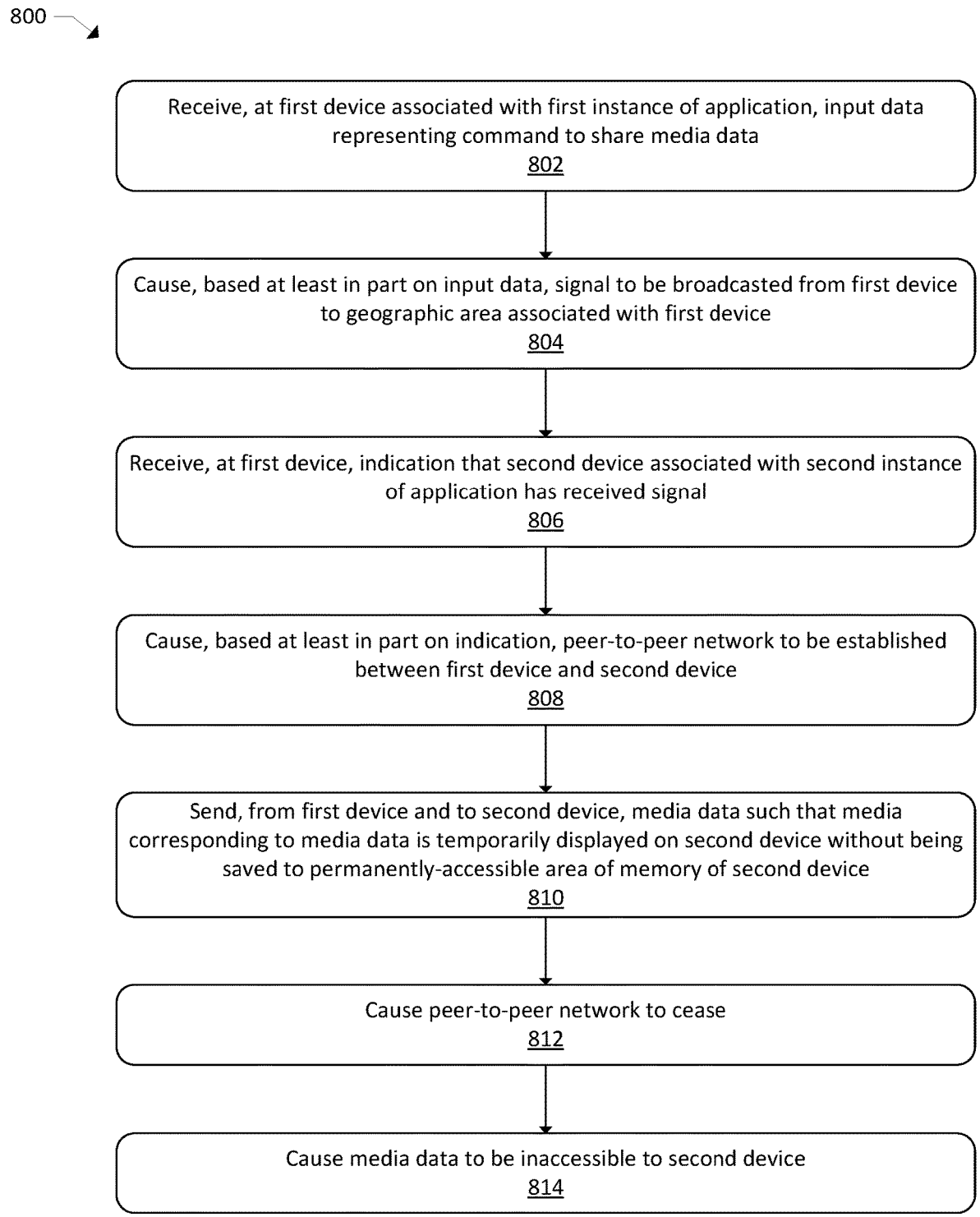
FIG. 8 illustrates a flow diagram of another example process for live proximity-based media transfer.

FIGS. 7 and 8 illustrates processes for live proximity-based media transfer. The processes described herein are illustrated as collections of blocks in logical flow diagrams, which represent a sequence of operations, some or all of which may be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation, unless specifically noted. Any number of the described blocks may be combined in any order and/or in parallel to implement the process, or alternative processes, and not all of the blocks need be executed. For discussion purposes, the processes are described with reference to the environments, architectures and systems described in the examples herein, such as, for example those described with respect to FIGS. 1-6, although the processes may be implemented in a wide variety of other environments, architectures and systems.

FIG. 7 illustrates a flow diagram of an example process for live proximity-based media transfer. The order in which the operations or steps are described is not intended to be construed as a limitation, and any number of the described operations may be combined in any order and/or in parallel to implement process 700.

At block 702, the process 700 may include receiving, at a first device associated with a first instance of an application, first input data representing a request to share image data with one or more viewing devices. For example, the first instance of the application may be downloaded or otherwise accessed on the first device, and the second instance of the application may be downloaded or otherwise accessed on the second device. The application may allow for media sharing between the devices. A first user of the first device may utilize the application to share media with a second user of the second device. For example, a user interface of the application may present an option to share or view media. The first user may select a portion of a display of the first device corresponding to a share icon.

At block 704, the process 700 may include causing, based at least in part on the first input data, a signal to be broadcasted from the first device to a geographic area associated with the first device. For example, based at least in part on selecting the share icon, the first device may broadcast a signal over a certain geographic area around the first device, such as by utilizing a GPS component and a transceiver. The geographic area, for example may be a number of feet, such as from about 0.1 feet to about 25 feet from the first device. In other examples, the geographic area may be configurable, such as by the user and based on the circumstances and/or environment. For example, if the users are located in a large open area, the geographic area may be decreased such that only users close to the first user may receive the signal. In other examples, such as when the devices are being utilized in a meeting where all or nearly all devices in a conference room are desired to receive the signal, the geographic area may be increased. The second user may select a portion of the display of the second device corresponding to a view icon. Based at least in part on selecting the view icon, the second device may receive the signal broadcasted by the first device.

At block 706, the process 700 may include receiving, at the first device, an indication that a second device associated with a second instance of the application has received the signal, the second device being within the geographic area associated with the first device. The indication may include data that represents the device identifier for the second device.

At block 708, the process 700 may include causing, based at least in part on the indication, a peer-to-peer network to be established, the peer-to-peer network configured to transmit the image data temporarily from the first device to the second device. In these examples, the transceiver in each of the devices may be configured and permitted to send data back and forth between the devices, and the application and/or other components of the devices may be configured to encrypt and/or decrypt the data sent between devices.

Once the network is established between the first device and the second device, the user interface of the first device may provide an indication that the second device is viewing media shared by the first device. This indication may correspond to an icon on the user interface that indicates a number of viewer devices currently viewing media shared by the first device. The icon may be selectable and, when selected, may cause the user interface of the first device to display a naming indicator for some or all of the viewer devices. By so doing, the first user may determine which devices are currently connected to the first device via the network. The user interface may include functionality that allows the first user to disconnect from one or more of the viewer devices and/or control what information is displayed to given viewer devices.

At block 710, the process 700 may include causing, at the second device and based at least in part on causing the peer-to-peer network to be established, functionality of the second instance of the application to be limited such that the image data is removed from the second device at least upon cessation of the peer-to-peer network.

At block 712, the process 700 may include sending, from the first device and to the second device, the image data. For example, the first device may then share media, such as photos, with the viewer devices. For example, the first user may utilize the user interface of the first device to access a database of the first device and then select which media to share. In examples, the first user may select multiple photos and the first device may generate a group of the selected photos. By way of example, the first user may select photos associated with a given event, such as a vacation, and generate a group with the selected photos. Additional methods of generating groups of media and/or selecting media to be associated with a group may be utilized. For example, searching functionality may be provided in the user interface to allow the user to search for media associated with a given event, time, time range, location, and/or depiction of given objects in the media, such as a given person and/or landscape.

To share media, the first user may select media from the database and/or may select a given group of media to share. The user interface may be utilized to receive input from the first user to select a given portion of the media to share and an icon may be presented via the user interface to confirm that the first user has indicated that the selected media should be shared. Based at least in part on receiving the user's input to share the media, an instance of the media may be transmitted from the first device to the one or more viewer devices.

At block 714, the process 700 may include receiving second input data requesting cessation of the peer-to-peer network. For example, when a user of the viewer device exits the application, the peer-to-peer network may be disabled and sharing of the media data may cease. Additionally, when the first device stops sharing media and/or switches between various media, commiserate changes occur on the viewer device. When the first user desires to stop sharing media, the first user may provide an indication of this intent utilizing the user interface and the peer-to-peer network may be terminated such that media data may cease being shared between devices.

At block 716, the process 700 may include causing the peer-to-peer network to cease. For example, when one or more of the indications and/or operations described with respect to block 714 occur, the network may be caused to cease.

At block 718, the process 700 may include causing the image data to be removed from the second device. For example, as discussed above, the functionality of the second device may be limited such that saving of the image data may not occur. When the network between the devices cease, and/or when the first device switches away from sharing a given image, the corresponding image data is removed from the second device, such as by removing the image data from the memory associated with the application and/or a cache associated with the second device.

Additionally, or alternatively, the process 700 may include receiving, from the second device, a request to establish the peer-to-peer network with the first device. The process 700 may also include causing display of a confirmation indicator requesting that a user of the first device indicate that the second device is authorized to view an image corresponding to the image data. The process 700 may also include receiving, at the first device, third input data indicating authorization for the second device to view the image. In these examples, causing the peer-to-peer network to be established may be based at least in part on the third input data.

Additionally, or alternatively, the process 700 may include receiving, at the first device, third input data representing a modification to the image data, the modification including at least one of a cropping of the image data, a viewing zoom associated with the image data, or an addition of media to the image data. The process 700 may also include generating, based at least in part on the third input data, second image data including the first image data and the modification. The process 700 may also include causing, at the second device, an image corresponding to the second image data to be displayed instead of the first image data.

Additionally, or alternatively, the process 700 may include causing the first instance of the application to access stored image data stored in association with the first device. The process 700 may also include receiving third input data representing a selection of image indicators associated with images of the stored image data. The process 700 may also include causing the images to be associated as a group with respect to the first instance of the application.

FIG. 8 illustrates a flow diagram of another example process for live proximity-based media transfer. The order in which the operations or steps are described is not intended to be construed as a limitation, and any number of the described operations may be combined in any order and/or in parallel to implement process 800.

At block 802, the process 800 may include receiving, at a first device associated with a first instance of an application, input data representing a command to share media data. For example, the first instance of the application may be downloaded or otherwise accessed on the first device, and the second instance of the application may be downloaded or otherwise accessed on the second device. The application may allow for media sharing between the devices. A first user of the first device may utilize the application to share media with a second user of the second device. For example, a user interface of the application may present an option to share or view media. The first user may select a portion of a display of the first device corresponding to a share icon.

At block 804, the process 800 may include causing, based at least in part on the input data, a signal to be broadcasted from the first device to a geographic area associated with the first device. For example, based at least in part on selecting the share icon, the first device may broadcast a signal over a certain geographic area around the first device, such as by utilizing a GPS component and a transceiver. The geographic area, for example may be a number of feet, such as from about 0.1 feet to about 25 feet from the first device. In other examples, the geographic area may be configurable, such as by the user and based on the circumstances and/or environment. For example, if the users are located in a large open area, the geographic area may be decreased such that only users close to the first user may receive the signal. In other examples, such as when the devices are being utilized in a meeting where all or nearly all devices in a conference room are desired to receive the signal, the geographic area may be increased. The second user may select a portion of the display of the second device corresponding to a view icon. Based at least in part on selecting the view icon, the second device may receive the signal broadcasted by the first device.

At block 806, the process 800 may include receiving, at the first device, an indication that a second device associated with a second instance of the application has received the signal. The indication may include data that represents the device identifier for the second device.

At block 808, the process 800 may include causing, based at least in part on the indication, a peer-to-peer network to be established between the first device and the second device. In these examples, the transceiver in each of the devices may be configured and permitted to send data back and forth between the devices, and the application and/or other components of the devices may be configured to encrypt and/or decrypt the data sent between devices.

Once the network is established between the first device and the second device, the user interface of the first device may provide an indication that the second device is viewing media shared by the first device. This indication may correspond to an icon on the user interface that indicates a number of viewer devices currently viewing media shared by the first device. The icon may be selectable and, when selected, may cause the user interface of the first device to display a naming indicator for some or all of the viewer devices. By so doing, the first user may determine which devices are currently connected to the first device via the network. The user interface may include functionality that allows the first user to disconnect from one or more of the viewer devices and/or control what information is displayed to given viewer devices.

At block 810, the process 800 may include sending, from the first device and to the second device, the media data such that media corresponding to the media data is temporarily displayed on the second device without being saved to a permanently-accessible area of memory of the second device.

At block 812, the process 800 may include causing the peer-to-peer network to cease. For example, the first device may then share media, such as photos, with the viewer devices. For example, the first user may utilize the user interface of the first device to access a database of the first device and then select which media to share. In examples, the first user may select multiple photos and the first device may generate a group of the selected photos. By way of example, the first user may select photos associated with a given event, such as a vacation, and generate a group with the selected photos. Additional methods of generating groups of media and/or selecting media to be associated with a group may be utilized. For example, searching functionality may be provided in the user interface to allow the user to search for media associated with a given event, time, time range, location, and/or depiction of given objects in the media, such as a given person and/or landscape.

To share media, the first user may select media from the database and/or may select a given group of media to share. The user interface may be utilized to receive input from the first user to select a given portion of the media to share and an icon may be presented via the user interface to confirm that the first user has indicated that the selected media should be shared. Based at least in part on receiving the user's input to share the media, an instance of the media may be transmitted from the first device to the one or more viewer devices.

At block 814, the process 800 may include causing the media data to be inaccessible to the second device. For example, when a user of the viewer device exits the application, the peer-to-peer network may be disabled and sharing of the media data may cease. Additionally, when the first device stops sharing media and/or switches between various media, commiserate changes occur on the viewer device. When the first user desires to stop sharing media, the first user may provide an indication of this intent utilizing the user interface and the peer-to-peer network may be terminated such that media data may cease being shared between devices.

Additionally, or alternatively, the process 800 may include receiving, from the second device, a request to establish the peer-to-peer network with the first device. The process 800 may also include causing display of a confirmation indicator requesting that a user of the first device indicate that the second device is authorized to view the media corresponding to the media data. The process 800 may also include receiving, at the first device, second input data indicating authorization for the second device to view the media. In these examples, causing the peer-to-peer network to be established may be based at least in part on the second input data.

Additionally, or alternatively, the process 800 may include receiving, at the first device, second input data representing a modification to the first media data, the modification including at least one of a cropping of the media data, a viewing zoom associated with the media data, a highlighting of at least a portion of the media data, or an addition of information to the media data. The process 800 may also include generating, based at least in part on the second input data, second media data including the first media data and the modification. The process 800 may also include causing, at the second device, second media corresponding to the second media data to be displayed instead of the first media data.

Additionally, or alternatively, the process 800 may include causing the first instance of the application to access stored media data stored in association with the first device. The process 800 may also include receiving second input data representing a selection of media indicators associated with media of the stored media data. The process 800 may also include causing the media of the stored media data to be associated as a group with respect to the first instance of the application.

Additionally, or alternatively, the process 800 may include displaying, on the first device and based at least in part on receiving the first indication that the second device has received the signal, at least one of numbers or letters representing a code. The process 800 may also include receiving, from the second device, a second indication that the code has been input via the second device. In these examples, causing the peer-to-peer network to be established may be based at least in part on receiving the second indication.

Additionally, or alternatively, the process 800 may include causing, based at least in part on causing the peer-to-peer network to be established, functionality associated with the second instance of the application to be restricted to viewing the media and performing at least one of a zoom function or a pan function. Additionally, it should be understood that the media data may include text data, image data, video data, and/or live-photo data.

Additionally, or alternatively, the process 800 may include causing display, on the first device, of a viewer icon indicating a number of devices that the first device is sharing the media data with. The process 800 may also include receiving second input data indicating a selection of the viewer icon. The process 800 may also include causing, based at least in part on the second input data, display of device identifiers of the devices that the first device is sharing the media data with.

While the foregoing invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims.

What is claimed is:

1. A method, comprising:
   receiving, at a first device associated with a first instance of an application, first input data representing a request to share image data with one or more viewing devices;
   causing, based at least in part on the first input data, a signal to be broadcasted from the first device to a geographic area associated with the first device;
   receiving, at the first device, an indication that a second device associated with a second instance of the application has received the signal, the second device being within the geographic area associated with the first device;
   causing, based at least in part on the indication, a peer-to-peer network to be established, the peer-to-peer network configured to transmit the image data temporarily from the first device to the second device such that permission associated with the image data for the second device is restricted to viewing the image data, thereby preventing the second device from permanently storing the image data;
   causing, at the second device, via the second instance of the application, and based at least in part on causing the peer-to-peer network to be established, the image data to be removed from the second device at least upon cessation of the peer-to-peer network;
   sending, from the first device and to the second device, the image data;
   receiving second input data requesting cessation of the peer-to-peer network;
   causing the peer-to-peer network to cease; and
   causing the image data to be removed from the second device.

2. The method of claim 1, further comprising:
   receiving, from the second device, a request to establish the peer-to-peer network with the first device;
   causing display of a confirmation indicator requesting that a user of the first device indicate that the second device is authorized to view an image corresponding to the image data;
   receiving, at the first device, third input data indicating authorization for the second device to view the image; and
   wherein causing the peer-to-peer network to be established comprises causing the peer-to-peer network to be established based at least in part on the third input data.

3. The method of claim 1, wherein the image data comprises first image data, and the method further comprises:
   receiving, at the first device, third input data representing a modification to the image data, the modification including at least one of a cropping of the image data, a viewing zoom associated with the image data, a highlighting of at least a portion of the image data, or an addition of media to the image data;
   generating, based at least in part on the third input data, second image data including the first image data and the modification; and
   causing, at the second device, an image corresponding to the second image data to be displayed instead of the first image data.

4. The method of claim 1, further comprising:
   causing the first instance of the application to access stored image data stored in association with the first device;
   receiving third input data representing a selection of image indicators associated with images of the stored image data; and
   causing the images to be associated as a group with respect to the first instance of the application.

5. A method, comprising:
   receiving, at a first device associated with a first instance of an application, input data representing a command to share media data;
   causing, based at least in part on the input data, a signal to be broadcasted from the first device to a geographic area associated with the first device;
   receiving, at the first device, an indication that a second device associated with a second instance of the application has received the signal;
   causing, based at least in part on the indication, a peer-to-peer network to be established between the first device and the second device;
   sending, from the first device and to the second device, the media data having access restricted to viewing the media data for the second device such that media corresponding to the media data is temporarily displayed on the second device without being saved to a permanently-accessible area of memory of the second device;
   causing the peer-to-peer network to cease; and
   causing the media data to be inaccessible on the second device.

6. The method of claim 5, wherein the input data comprises first input data, and the method further comprises:
   receiving, from the second device, a request to establish the peer-to-peer network with the first device;
   causing display of a confirmation indicator requesting that a user of the first device indicate that the second device is authorized to view the media corresponding to the media data;

receiving, at the first device, second input data indicating authorization for the second device to view the media; and wherein causing the peer-to-peer network to be established comprises causing the peer-to-peer network to be established based at least in part on the second input data.

7. The method of claim 5, wherein the input data comprises first input data, the media data comprises first media data, the media comprises first media, and the method further comprises:

receiving, at the first device, second input data representing a modification to the first media data, the modification including at least one of a cropping of the media data, a viewing zoom associated with the media data, a highlighting of at least a portion of the media data, or an addition of information to the media data;

generating, based at least in part on the second input data, second media data including the first media data and the modification; and causing, at the second device, second media corresponding to the second media data to be displayed instead of the first media data.

8. The method of claim 5, wherein the input data comprises first input data, and the method further comprises:

causing the first instance of the application to access stored media data stored in association with the first device;

receiving second input data representing a selection of media indicators associated with media of the stored media data; and causing the media of the stored media data to be associated as a group with respect to the first instance of the application.

9. The method of claim 5, wherein the indication comprises a first indication, and the method further comprises:

displaying, on the first device and based at least in part on receiving the first indication that the second device has received the signal, at least one of numbers or letters representing a code;

receiving, from the second device, a second indication that the code has been input via the second device; and wherein causing the peer-to-peer network to be established comprises causing the peer-to-peer network to be established based at least in part on receiving the second indication.

10. The method of claim 5, further comprising causing, based at least in part on causing the peer-to-peer network to be established, functionality associated with the second instance of the application to be restricted to viewing the media and performing at least one of a zoom function or a pan function.

11. The method of claim 5, wherein the media data comprises at least one of:
image data;
live-photo data;
text data;
presentation data;
page data; or
video data.

12. The method of claim 5, wherein the input data comprises first input data, and the method further comprises:

causing display, on the first device, of a viewer icon indicating a number of devices that the first device is sharing the media data with;

receiving second input data indicating a selection of the viewer icon; and causing, based at least in part on the second input data, display of device identifiers of the devices that the first device is sharing the media data with.

13. A device, comprising:
one or more processors; and
non-transitory computer-readable media storing computer-executable instructions that, when executed by the one or more processors, cause the one or more processors to perform operations comprising:

receiving input data representing a command to share media data;

causing, based at least in part on the input data, a signal to be broadcasted to a geographic area associated with the device;

receiving an indication that a viewer device has received the signal;

causing, based at least in part on the indication, a peer-to-peer network to be established with the viewer device;

sending, to the viewer device, the media data having access restricted to viewing the media data for the viewer device such that media corresponding to the media data is temporarily displayed on the viewer device without being saved to a permanently-accessible area of memory of the viewer device;

causing the peer-to-peer network to cease; and causing the media data to be inaccessible on the viewer device.

14. The device of claim 13, wherein the input data comprises first input data, and the operations further comprise:

receiving, from the viewer device, a request to establish the peer-to-peer network;

causing display of a confirmation indicator requesting that a user indicate that the viewer device is authorized to view the media corresponding to the media data;

receiving second input data indicating authorization for the viewer device to view the media; and wherein causing the peer-to-peer network to be established comprises causing the peer-to-peer network to be established based at least in part on the second input data.

15. The device of claim 13, wherein the input data comprises first input data, the media data comprises first media data, the media comprises first media, and the operations further comprise:

receiving second input data representing a modification to the first media data, the modification including at least one of a cropping of the media data, a viewing zoom associated with the media data, a highlighting of at least a portion of the media data, or an addition of information to the media data;

generating, based at least in part on the second input data, second media data including the first media data and the modification; and causing, at the viewer device, second media corresponding to the second media data to be displayed instead of the first media data.

16. The device of claim 13, wherein the input data comprises first input data, and the operations further comprise:

causing an application to access stored media data;

receiving second input data representing a selection of media indicators associated with media of the stored media data; and causing the media of the stored media data to be associated as a group with respect to the application.

17. The device of claim 13, wherein the indication comprises a first indication, and the operations further comprise:

displaying, based at least in part on receiving the first indication that the viewer device has received the signal, at least one of numbers or letters representing a code;

receiving, from the viewer device, a second indication that the code has been input via the viewer device; and wherein causing the peer-to-peer network to be established comprises causing the peer-to-peer network to be established based at least in part on receiving the second indication.

18. The device of claim 13, further comprising causing, based at least in part on causing the peer-to-peer network to be established, functionality associated with an application utilized to view the media to be restricted to viewing the media and performing at least one of a zoom function or a pan function.

19. The device of claim 13, wherein the media data comprises at least one of:

image data;
   live-photo data;
   text data;
   presentation data;
   page data; or
   video data.

20. The device of claim 13, wherein the input data comprises first input data, and the operations further comprise:

causing display of a viewer icon indicating a number of devices that the device is sharing the media data with;

receiving second input data indicating a selection of the viewer icon; and causing, based at least in part on the second input data, display of device identifiers of the devices that the device is sharing the media data with.

\* \* \* \* \*